(12) United States Patent
Zou et al.

(10) Patent No.: US 7,390,999 B1
(45) Date of Patent: Jun. 24, 2008

(54) DIFFERENTIAL SHACK-HARTMANN CURVATURE SENSOR

(75) Inventors: Weiyao Zou, Orlando, FL (US); Jannick Rolland, Chuluota, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 132 days.

(21) Appl. No.: 11/414,586

(22) Filed: Apr. 28, 2006

Related U.S. Application Data

(60) Provisional application No. 60/692,884, filed on Jun. 22, 2005.

(51) Int. Cl.
*G01J 1/20* (2006.01)
(52) U.S. Cl. .................. 250/201.9; 250/208.1; 356/121
(58) Field of Classification Search ............. 250/201.9, 250/208.1, 201.1; 356/121, 521, 508; 359/623
See application file for complete search history.

(56) References Cited

U.S. PATENT DOCUMENTS 6,130,419 A * 10/2000 Neal .................. 250/201.9
7,078,665 B2 * 7/2006 Topa .................. 250/201.9

\* cited by examiner

*Primary Examiner*—Hung X. Dang
(74) *Attorney, Agent, or Firm*—Brian S. Steinberger; Phyllis K. Wood; Law Offices of Brian S. Steinberger, P.A.

(57) ABSTRACT

A differential Shack-Hartmann curvature sensor for measuring a curvature including principal curvatures and directions of a wavefront. The curvature sensor includes a Shack-Hartmann sensor with an input beam and an optical element to split said input beam into three output beams traveling in different directions. Three lenslet arrays in each of the three beam paths produce corresponding Hartmann grids. A shearing device shears two of the three Hartmann grids in two perpendicular directions a differential difference. A measuring device measures the Hartmann grid coordinates generated by said three beams to determine various curvatures of the wavefront at each of the Hartmann grid points.

27 Claims, 7 Drawing Sheets

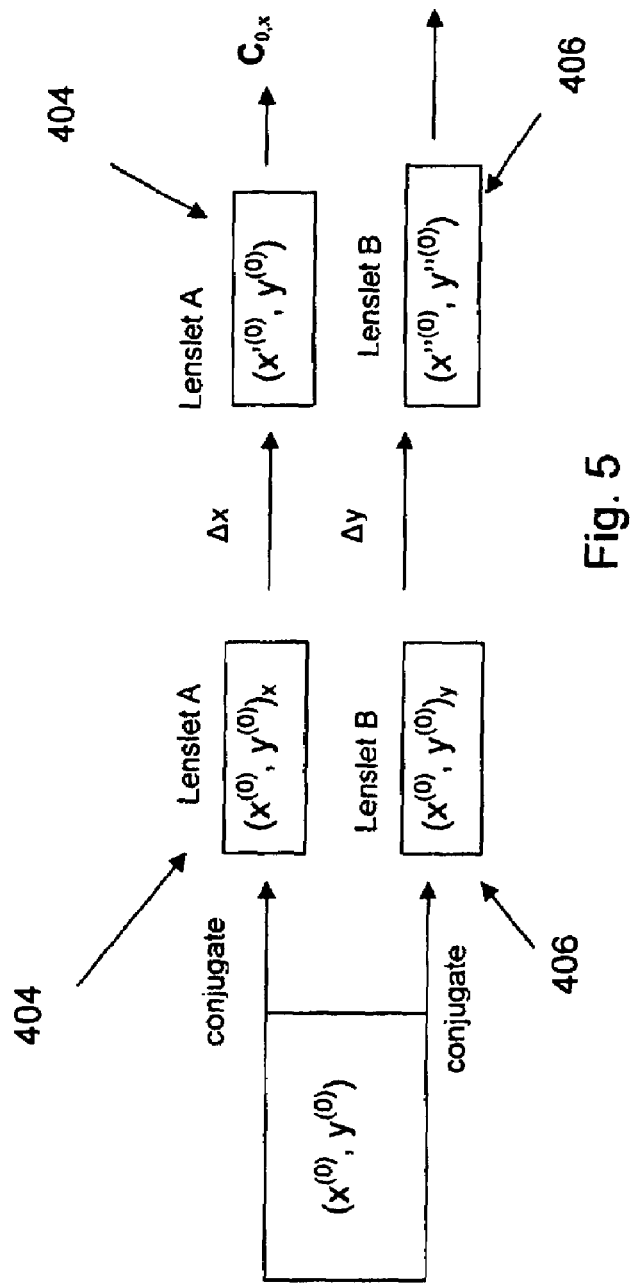

DIFFERENTIAL SHACK-HARTMANN CURVATURE SENSOR

This application claims the benefit of priority to U.S. Provisional Patent Application No. 60/692,884 filed on Jun. 22, 2005.

FIELD OF THE INVENTION

This invention relates to sensors and, in particular, to methods, systems, apparatus and devices for a differential Shack-Hartmann curvature sensor to measure the differentials of wave front slope, i.e. wave front curvatures, to determine the wave front shape for use in active/adaptive optics, optical testing, opthalmology, telescope image analysis and atmosphere and random media characterizations.

BACKGROUND AND PRIOR ART

The Shack-Hartmann sensor is one of the most popular wavefront sensors presently available. The sensor measures the slope data of the wavefront by comparing the coordinates of Hartmann grid points from the measurement beam with coordinates from the reference beam. FIG. 1 is a schematic layout of a prior art Shack-Hartmann sensor. Hartmann invented the Hartmann test in 1900, and Roland Shack improved this technique by introducing a lenslet array in 1971. The reference beam was generated by a pin-hole light source and injected into this system as ideal wavefront to calibrate the systematic error. In FIG. 1, reference beam 105 is represented by a dashed line, and the continuous line represents the measurement beam 120. The wavefront is first collimated by the collimation lens then passes through a lenslet array 110. The Hartmann screen divides the wavefront into many sub-apertures, then the micro-lens array 110 focus the wavefront of each sub-aperture into a group of Hartmann grid points. Comparing the coordinate differences between the measured wavefront and the reference wavefront, the wavefront slopes can be calculated according to the following formula:

$$\frac{\partial W}{\partial x}\bigg|_i = \frac{x_i^{mea} - x_i^{ref}}{f} \quad (1)$$

$$\frac{\partial W}{\partial y}\bigg|_i = \frac{y_i^{mea} - y_i^{ref}}{f},$$

where $(x_i^{ref}, y_i^{ref})$ (i=1, 2, ..., m, m=t×t is the total number of grid points) is the Hartmann grid coordinates of the reference beam, $(x_i^{mea}, y_i^{mea})$ is the Hartmann grid coordinates of the measurement beam, and f is the focal length of the lenslet array.

Compared to the Hartmann test, the Shack-Hartmann wavefront sensor provides improved photon efficiency because the position of the focal spot is proportional to the average wavefront slope over each sub-aperture and the position is independent of higher-order aberrations and intensity profile variations. The Shack-Hartmann sensor is a parallel wavefront sensor operating in real time. It has application in active/adaptive optics, optical testing, opthalmology, telescope image analysis and atmosphere and random media characterizations.

However, the usage of the Shack-Hartmann sensor is restrictive because it requires an external reference, or a reference beam, and is sensitive to vibration, tilt and whole body movement. Therefore, a need exists for a sensor that provides the benefits of the Shack-Hartmann sensor without the limitations.

SUMMARY OF THE INVENTION

A primary objective of the invention is to provide a new method, system, apparatus and device for measuring differentials of the wave front slopes to determine the wave front curvature without the use of an external reference or reference light source after calibration.

A secondary objective of the invention is to provide a new method, system, apparatus and device measuring differentials of the wavefront slopes to determine the wavefront curvature independent of vibration, tilt or whole body movement so it is useful for measurements on a moving stage.

A third objective of the invention is to provide a new method, system, apparatus and device for a differential Shack-Hartmann curvature sensor that is scale tunable by varying differential values.

A fourth objective of the invention is to provide a new method, system, apparatus and device for a differential Shack-Hartmann curvature sensor that can be applied in optical testing with vibration.

A fifth objective of the invention is to provide a new method, system, apparatus and device for a differential Shack-Hartmann curvature sensor without moving parts for increased reliability.

A sixth objective of the invention is to provide a new method, system, apparatus and device for a differential Shack-Hartmann curvature sensor for use in optical testing, active and adaptive optics, shape-extraction in bio-optics and opthalmology, such as corneal measurement.

A seventh objective of the invention is to provide a new method, system, apparatus and device for a differential Shack-Hartmann curvature sensor for measuring the normal curvatures and the twist curvature terms.

An eighth objective of the invention is to provide a new method, system, apparatus and device for a differential Shack-Hartmann curvature sensor for measuring the wave front principal curvatures and directions.

A first preferred embodiment of the invention provides a method, system and apparatus for providing a differential Shack-Hartmann curvature sensor for measuring the local curvatures of a wavefront. The differential Shack-Hartmann curvature sensor includes a Shack-Hartmann sensor with an output beam and an optical element to split said output beam into three beams traveling in three different directions. Three lenslet arrays mounted in the paths of the three beams generate three corresponding Hartmann grids. A shearing device makes two of the three lenslet arrays shear a differential difference in two perpendicular directions, respectively, comparing to the third lenslet array. A measuring device measures the Hartmann grid coordinates generated by said three lenslet arrays to determine the curvature of the wavefront at each of said Hartmann grid point.

In the second and third embodiment, wavefront curvature is measured by using a Shack-Hartmann sensing system that has three output beams. Two of the three output beams are sheared in two perpendicular directions comparing to the third one with their corresponding two lenslet arrays conjugated to the third one, and the Hartmann grids are differentially displaced. Differentials of plural wavefront slopes at said plural Hartmann grid points of the said third lenslet array are measured, and the curvatures of the wavefront at the plural Hartmann grid points are obtained.

Further objects and advantages of this invention will be apparent from the following detailed description of preferred embodiments, which are illustrated schematically in the accompanying drawings.

BRIEF DESCRIPTION OF THE FIGURES

FIG. 5 shows a calibration block diagram according to the present invention.

FIG. 7b shows the object space of Roddier's curvature sensing corresponding to the image space of FIG. 7a.

DESCRIPTION OF THE PREFERRED EMBODIMENTS

Figure 1:
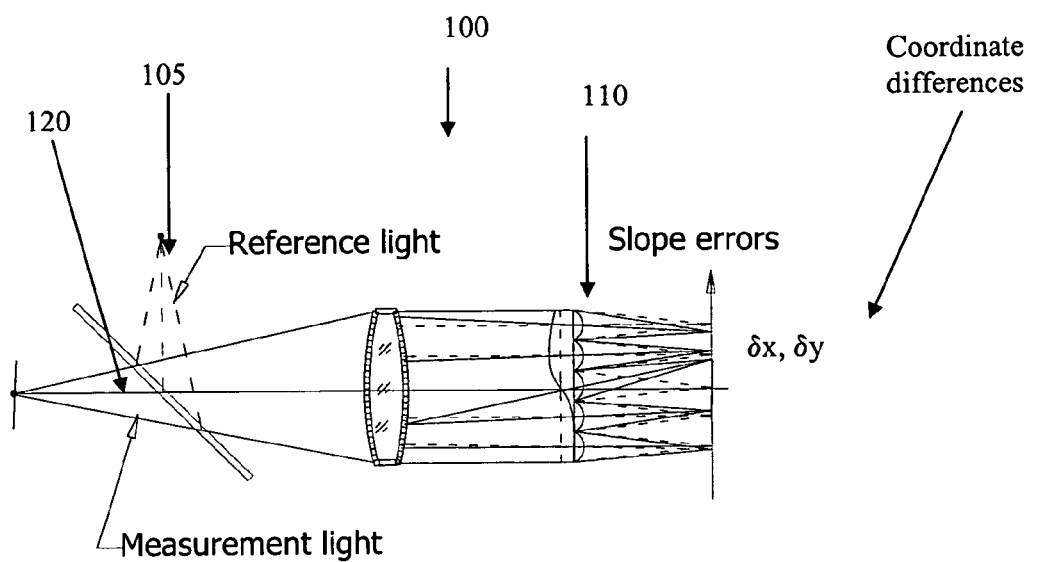
FIG. 1 shows a prior art Hartmann screen and lenslet array and their coordinate differences.

Before explaining the disclosed embodiments of the present invention in details it is to be understood that the invention is not limited in its application to the details of the particular arrangements shown since the invention is capable of other embodiments. Also, the terminology used herein is for the purpose of description and not of limitation.

The following is a list of the reference numbers used in the drawings and the detailed specification to identify components:

| | |
|---|---|
| 100 | Shack-Hartmann sensor |
| 105 | reference beam |
| 110 | Hartmann screen and lenslet array |
| 120 | measurement beam |
| 200 | Hartmann grid |
| 310 | Hartmann grid |
| 320 | horizontal displacement ($s_x$) |
| 330 | vertical displacement ($s_y$) |
| 400 | differential Shack-Hartmann curvature sensor |
| 402 | first lenslet array |
| 404 | second lenslet array |
| 406 | third lenslet array |
| 410 | beam splitters |
| 412 | first camera |
| 414 | second camera |
| 416 | third camera |
| 417 | lenslet shearing device (x) |
| 418 | lenslet shearing device (y) |
| 610 | first light source |
| 620 | second light source |

Figure 2:
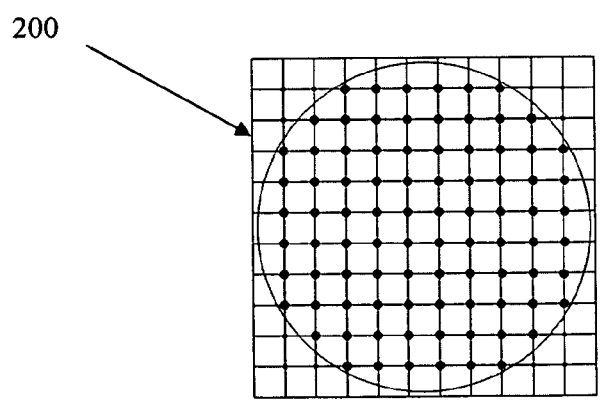
FIG. 2 shows an example of a prior art Hartmann grid.
Figure 3:
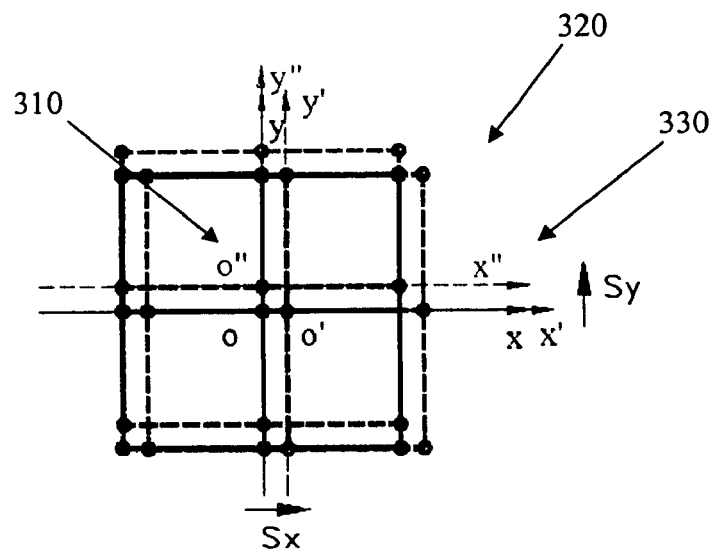
FIG. 3 shows a Shack-Hartmann grid with displacements in the x and the y directions.

The method, system, apparatus and device of the present invention provides a Shack-Hartmann curvature sensor that shears the Shack-Hartmann grid, horizontally and vertically, as shown in FIG. 3 to measure the wavefront curvatures at each Hartmann grid point. The curvature is the derivative of slopes. The differential Shack-Hartmann curvature sensor of the present invention is based on the prior art Shack-Hartmann sensor and the Hartmann grid shown in FIGS. 1 and 2, respectively. By measuring the differentials of the wavefront slopes at each Hartmann grid point, the wavefront local curvatures (normal curvatures and the twist term curvature) are determined, from which the principal curvatures and directions of the wave front are computed.

A. Normal Curvature Measurements

Differential displacements are made in the x and y directions to obtain slope differentials of the wavefront, the wavefront curvatures. The curvature sensor of the present invention is implemented as a Shack-Hartmann sensor with three output channels for achieving the Hartmann grid shearing in two perpendicular directions. The slope is measured in the three channels as well as the curvature of the wavefront at each Hartmann grid point.

The Hartmann grid is shifted a lateral differential distance in the x and in the y direction, which are suggested in this invention to adopt $1/10$ to $1/2$ of the pitch size of the Hartmann grid according to each specific application. As shown in FIG. 3, for example, the slopes at each point are measured before and after the differential shift to obtain the slope differentials, the curvature in the x direction and in the y direction can be obtained by applying $$c_x(i) = \frac{\partial^2 W}{\partial x^2}\bigg|_i = \frac{1}{s_x}\left(\frac{\partial W}{\partial x}\bigg|_{i'} - \frac{\partial W}{\partial x}\bigg|_i\right) = \frac{1}{f}\left(\frac{x_i'^{mea} - x_i^{mea}}{s_x}\right) - c_{0,x}(i) \quad (2)$$

$$c_y(i) = \frac{\partial^2 W}{\partial y^2}\bigg|_i = \frac{1}{s_y}\left(\frac{\partial W}{\partial y}\bigg|_{i'} - \frac{\partial W}{\partial y}\bigg|_i\right) = \frac{1}{f}\left(\frac{y_i'^{mea} - y_i^{mea}}{s_y}\right) - c_{0,y}(i),$$

where $c_{0,x}(i)$ and $c_{0,y}(i)$ are obtained by $$c_{0,x}(i) = \frac{1}{f}\left(\frac{x_i'^{Ref} - x_i^{Ref}}{s_x}\right) \quad (3)$$

$$c_{0,y}(i) = \frac{1}{f}\left(\frac{y_i'^{Ref} - y_i^{Ref}}{s_y}\right),$$

and in this paper $s_x$ and $s_y$ are the differential shifts in the x- and y-directions, respectively. Theoretically $c_{0,x}(i)$ and $c_{0,y}(i)$ are "1/f", because the lenslet array is moved a lateral distance $s_x$ in x-direction, for example, the reference Shack-Hartmann grid moves exactly the same distance $s_x$ accordingly, therefore, $x_i'^{Ref} - x_i^{Ref} = s_x$ and $c_{0,x}(i)=1/f$; similarly, $c_{0,y}(i)=1/f$. However, in practice $c_{0,x}(i)$ and $c_{0,y}(i)$ are not "1/f", because the coordinates are measured by different CCD cameras, so they belong to different coordinate system and therefore $c_{0,x}(i)$ and $c_{0,y}(i)$ are obtained by calibration.

The slope differentials in the cross directions, referred to as the corresponding twist curvatures, are given by $$c_{xy}(i) = \frac{\partial^2 W}{\partial x \partial y}\bigg|_i = \frac{1}{s_y}\left(\frac{\partial W}{\partial x}\bigg|_{i'} - \frac{\partial W}{\partial x}\bigg|_i\right) = \frac{1}{f}\left(\frac{x_i'^{mea} - x_i^{mea}}{s_x}\right) - c_{0,xy}(i) \quad (4)$$

-continued $$c_{yx}(i) = \frac{\partial^2 W}{\partial y \partial x}\bigg|_i = \frac{1}{s_x}\left(\frac{\partial W}{\partial y}\bigg|_{i'} - \frac{\partial W}{\partial y}\bigg|_i\right) = \frac{1}{f}\left(\frac{y_i'^{mea} - y_i^{mea}}{s_x}\right) - c_{0,yx}(i),$$

where $c_{0,yx}(i)$ and $c_{0,xy}(i)$ are constants given by $$c_{0,yx}(i) = \frac{1}{f}\left(\frac{y_i'^{Ref} - y_i^{Ref}}{s_x}\right) \quad (5)$$

$$c_{0,xy}(i) = \frac{1}{f}\left(\frac{x_i''^{Ref} - x_i^{Ref}}{s_y}\right).$$

In Equations (2) and (4), $(x_i^{mea}, y_i^{mea})$, $(x_i'^{mea}, y_i'^{mea})$ and $(x_i''^{mea}, y_i''^{mea})$ (i=1, 2, ... m) are the coordinates of the measured original Hartmann grid points, the measured sheared Hartmann grid points in the x-direction and in y-direction, respectively. When a differential shift $s_x$ is made in x-direction, the y-coordinates remains unchanged, so $c_{0,yx}(i)=0$; similarly, $c_{0,xy}(i)=0$. However, in practice, these two constants may not be zero as the coordinates are measured by three CCD cameras, and they are usually obtained by calibration.

Figure 4A:
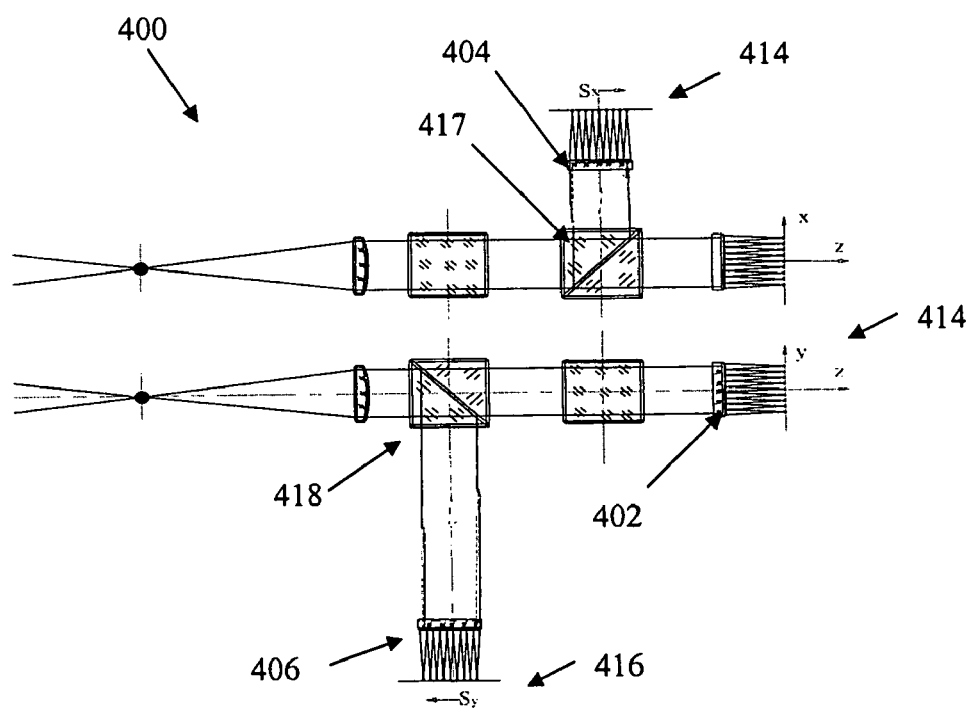
FIG. 4a shows a direct implementation layout of the differential Shack-Hartmann curvature sensor according to an embodiment of the present invention.

If the wavefront travels in the z direction, and the beam is split into three parts traveling in three different directions, one beam travels in the z-direction, another beam travels in the x-direction, and the third beam travels in the y-direction. For example, three lenslet arrays 402, 404 and 406, are placed in the three beams such that 402 is in the z-direction beam, 404 is in the x-direction beam, and 406 is in the y-direction beam as shown in FIG. 4a. Lenslet 404 is conjugated to 402, and 406 is conjugated to 402, separately. Using a micro-screw, lenslet array 404 is moved a differential distance in the x direction, and using a second micro-screw, lenslet array 406 is moved a differential distance value in the y direction. Thus, the lenslet 404 and lenslet 402 are shearing each other in the x direction, and lenslet 406 and lenslet 402 are shearing each other in the y direction. By measuring the coordinates of Hartmann grid points generated by the three beams, and applying Equations (2) and (4), the wavefront curvatures in the x and y directions and the twist terms are obtained. In an example, the Hartmann grid coordinates are measured by placing a charge-coupled device (CCD) camera in the path of each of the three beams for recording the Hartmann grid points.

Figure 4B:
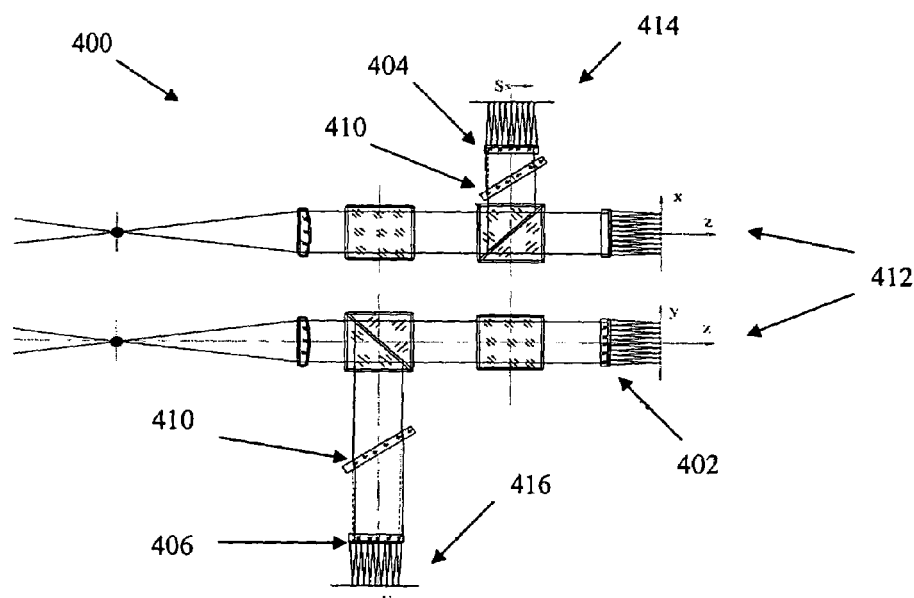
FIG. 4b shows another direct implementation layout of the differential Shack-Hartmann curvature sensor according to another embodiment of the present invention.
Figure 4C:
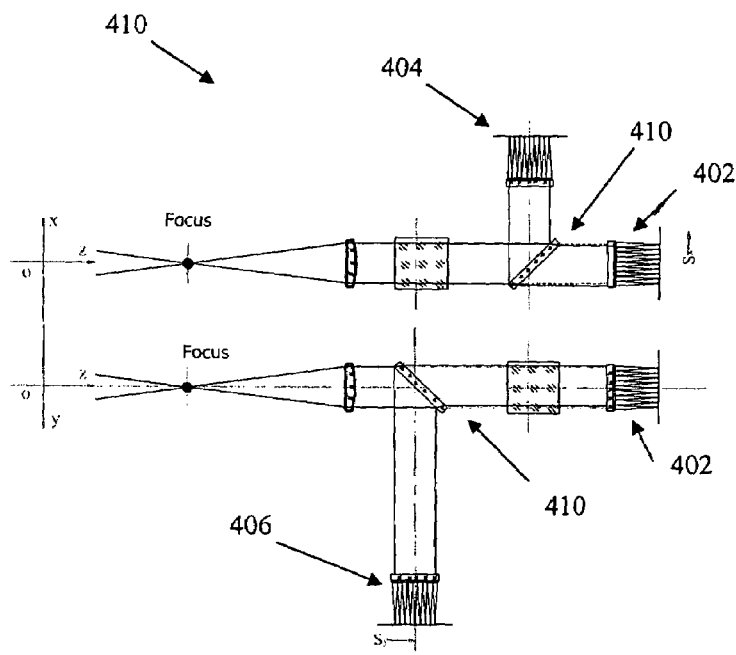
FIG. 4c shows yet another direct implementation of the differential Shack-Hartmann curvature sensor according to another embodiment of the present invention.

Examples of alternative direct implementation layouts are shown in FIGS. 4b and 4c. As shown in FIG. 4b, optical parallel plates 410 are used as shearing elements to make differential displacements between the lenslet arrays. In the embodiment shown in FIG. 4c, the optical parallel plates 410 also act as beam splitters.

The differential Shack-Hartmann curvature sensor 400 of the present invention uses three lenslet arrays 402, 404, 406 in three channels and three CCD cameras 412, 414, 416 to record the coordinates of the each Hartmann grid points as shown in FIG. 4a. Since the lenslet 402, 404, and 406 are recorded by different CCD cameras, a reference light beam is required to calibrate the system to obtain the unknown constants in Equation (2) and Equation (4).

The calibration diagram is shown in FIG. 5. First, it is necessary to make sure that lenslets 404 and 406 are conjugate to lenslet 402 and that the shearing differential values in the x and y directions are $s_x$ and $s_y$. A reference beam is introduced by an ideal flat mirror, and the coordinates of the grid points of the three Hartmann grids are recorded for use as references to compute the constant values $c_{0,x}(i)$, $c_{0,y}(i)$, $c_{0,yx}(i)$ and $c_{0,xy}(i)$ with Equations (3) and (5).

B. Principal Curvature Computations

The normal curvature is the change of the surface normal in an osculating plane, and the principal curvatures of a non-umbilical point are the maximum and minimum values of normal curvatures, say $\kappa_1$ and $\kappa_2$, in two perpendicular directions. Regarding a local patch of surface, the principal curvatures are invariants, which are insensitive to the surface orientation. In order to evaluate the principal curvatures, it is assumed that the neighborhood of a Hartmann grid point is represented by a "Monge patch" of the form:

$$X = x\vec{e}_1 + y\vec{e}_2 + W(x,y)\vec{e}_3, \quad (6)$$

where $(\vec{e}_1, \vec{e}_2, \vec{e}_3)$ is an orthogonal frame in Euclidean 3-space. Then the second fundamental form has a matrix to describe the local surface shape as $$II = \begin{pmatrix} \hat{\omega}_1^{13} & \hat{\omega}_1^{23} \\ \hat{\omega}_2^{13} & \hat{\omega}_2^{23} \end{pmatrix}, \quad (7)$$

where $\hat{\omega}_j^{i3}$ (i=1,2; j=1,2.) defines the component in $\vec{e}_i$ of the turning rate of the normal as the frame moves across the given point along $\vec{e}_j$. For a wave front traveling in the z-direction ($\vec{e}_3$), W(x,y) is the "height" as a function of x and y in the pupil plane. Then at each "Monge patch", the matrix II becomes $$II = \begin{pmatrix} c_x(i) & c_{yx}(i) \\ c_{xy}(i) & c_y(i) \end{pmatrix}, \ i = 1, 2, \cdots m, \quad (8)$$

where the diagonal terms $c_x(i)$ and $c_y(i)$ are the wave front normal curvatures in the x-direction and in the y-directions, i.e.

$$c_x(i) = \frac{\partial^2 W}{\partial x^2}(i) \text{ and } c_y(i) = \frac{\partial^2 W}{\partial y^2}(i);$$

the off-diagonal terms $c_{xy}(i)$ and $c_{yx}(i)$ are the corresponding twist curvature terms, i.e.

$$c_{xy}(i) = \frac{\partial^2 w}{\partial x \partial y}(i) \text{ and } c_{yx}(i) = \frac{\partial^2 w}{\partial y \partial x}(i).$$

It is assumed that $c_{xy}(i) = c_{yx}(i)$.

The determinant of matrix II, denoted as K, is known as the Gaussian curvature. The trace of the matrix II, denoted as 2H, is known as the mean curvature. Both Gaussian curvature and mean curvature are algebraic invariants, which do not change with rotation of the orthogonal frame ($\vec{e}_1, \vec{e}_2, \vec{e}_3$) about the normal.

By diagonalizing the matrix II to rotate the orthogonal frame about $\vec{e}_3$, the off-diagonal terms disappear, and a new matrix II' is obtained by $$II' = P^T II P, \quad (9)$$

where P is an orthogonal matrix defined by $$P = \begin{bmatrix} \cos\theta & -\sin\theta \\ \sin\theta & \cos\theta \end{bmatrix}, \quad (10)$$

where angle $\theta$ is defined as the frame rotation angle. The new matrix II' is a diagonal matrix, which is $$II' = \begin{pmatrix} \kappa_1(i) & 0 \\ 0 & \kappa_2(i) \end{pmatrix}, \quad (11)$$

where $\kappa_1(i)$ and $\kappa_2(i)$ ($\kappa_1(i) > \kappa_2(i)$) are the eigenvalues of the matrix II, also known as the first and second principal curvatures that define the maximum and minimum normal curvatures at a given point patch, and $i=1, 2, \ldots, m$, where m is the total number of Shack-Hartmann grid points. Plug the Equations (8), (10) and (11) into Equation (9), to obtain the principal curvatures $\kappa_1$ and $\kappa_2$ at each grid point as $$\kappa_{1,2}(i) = \frac{c_x(i) + c_y(i) \pm \sqrt{(c_x(i) - c_y(i))^2 + 4c_{xy}(i)^2}}{2}, \quad (12)$$

and the rotation angle $\theta$ is the angle between the first principal curvature and the x-direction, which can be obtained by $$\theta(i) = \frac{1}{2} \tan^{-1}\left( \frac{2c_{xy}(i)}{c_x(i) - c_y(i)} \right). \quad (13)$$

The principal curvatures can also be computed by evaluating the eigenvalues of matrix II with its characteristic equation as $$\det(\kappa I - II) = 0, \quad (14)$$

the result is the same as Equation (12). The rotation angle $\theta$ can also be computed with Euler's formula (1760) by $$\cos 2[\theta(i)] = \frac{2c_x(i) - 2H(i)}{\kappa_1(i) - \kappa_2(i)}, \quad (15)$$

where H is the mean curvature given by $$H(i) = (c_x(i) + c_y(i))/2, \quad (16)$$

Then the angle $\theta$ is given by $$\theta(i) = \frac{1}{2} \cos^{-1}\left( \frac{c_x(i) - c_y(i)}{\kappa_1(i) - \kappa_2(i)} \right). \quad (17)$$

Apply Equation (12) into Equation (17), to obtain $$\theta(i) = \frac{1}{2} \cos^{-1}\left( \frac{|c_x(i) - c_y(i)|}{\sqrt{(c_x(i) - c_y(i))^2 + 4c_{xy}(i)^2}} \right), \quad (18)$$

which is equivalent to Equation (13).

C. Comparisons with the Previous Arts

With the system calibrated, the discrepancies between the image de-magnifying systems are cancelled, the discrepancies between the two arms in the cube beam splitter are cancelled, and the aberrations in the collimator and the cube prisms are also cancelled. Besides the error from the ideal flat mirror used for introducing the reference beam, which can be very small, and the nominal errors in applying the shearing differential values in Equations (2) and (3), the remaining error sources are the discrepancies between lenslets 402, 404 and 406, which are negligible for high quality micro-lenslet arrays.

Figure 6:
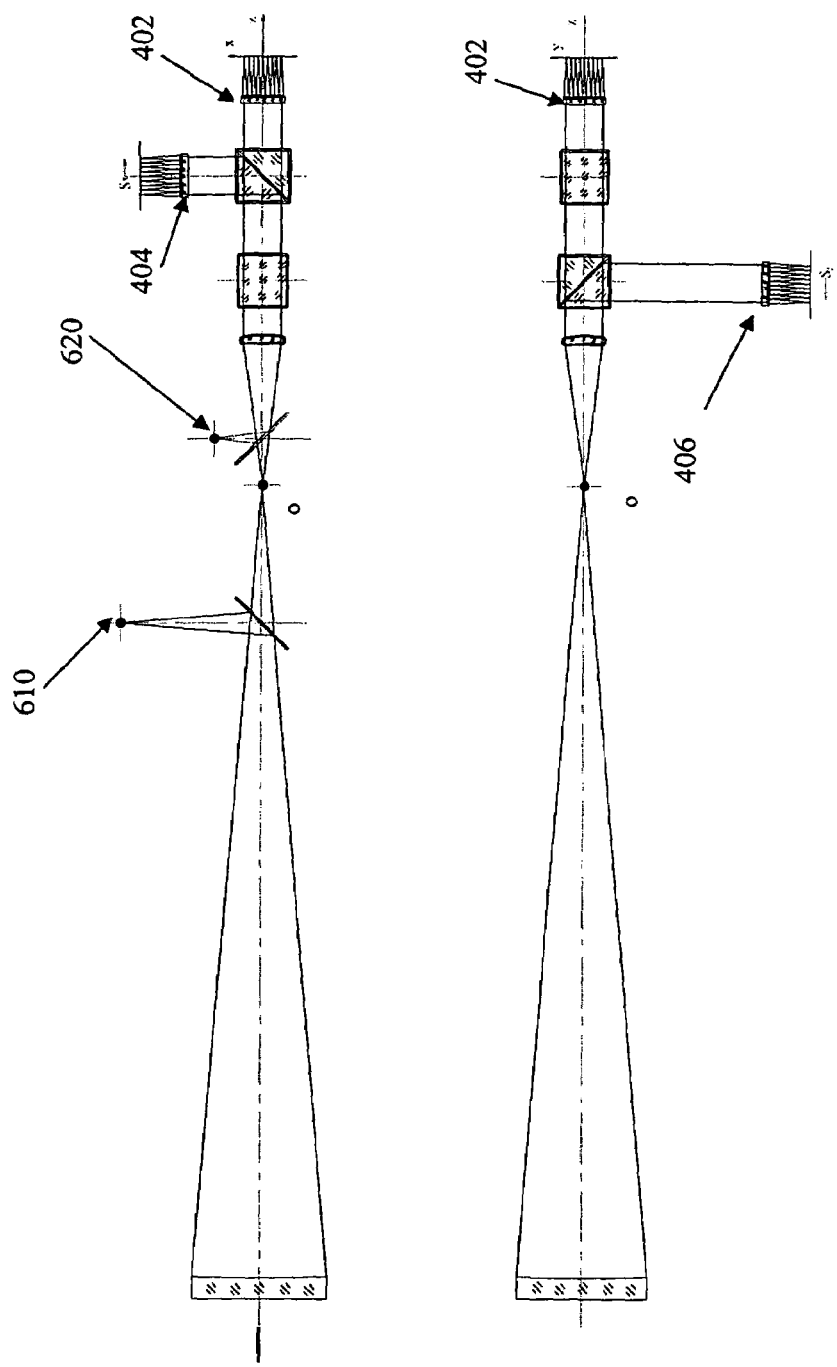
FIG. 6 shows an experimental system for the differential Shack-Hartmann curvature sensor according to the first embodiment of the present invention.

As shown in the configuration in FIG. 6, a point light source 610 is used to generate the beam for measurement and the point light source 620 is used to generate the beam for calibration. After calibration, no reference light beam is necessary.

Figure 7A:
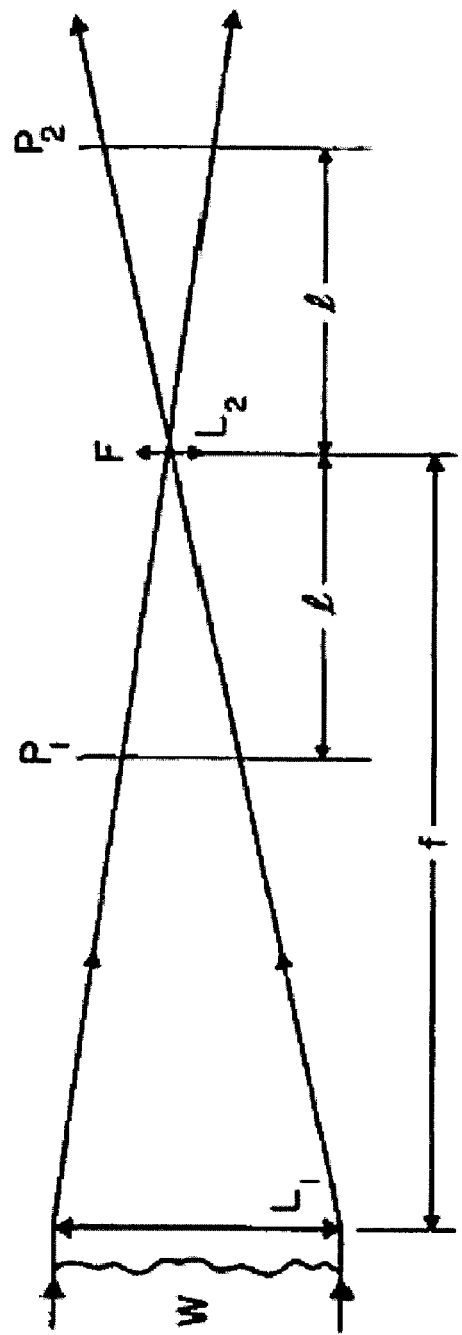
FIG. 7a shows the image space of Roddier's curvature sensing technique of the prior art.
Figure 7B:
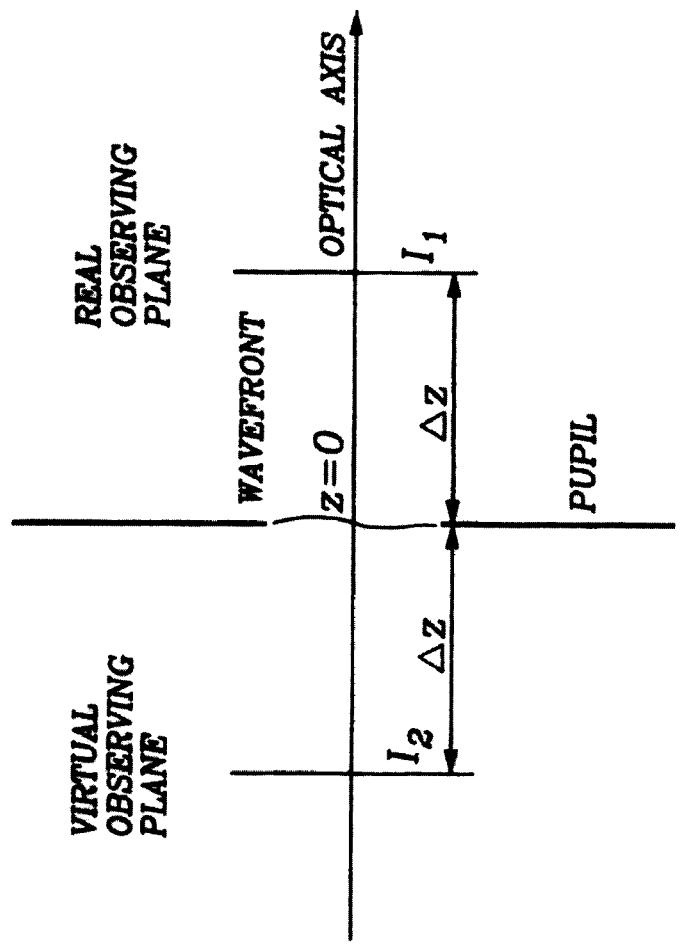

The following description compares the differential Shack-Hartmann curvature sensor with a prior art curvature sensor. In 1988, Francois Roddier proposed a method to measure the local curvature of the wavefront surface by measuring the difference in illumination of the two planes before and after the focal point as shown in FIG. 7. The Roddier' curvature sensor is based on the irradiance Poisson equation, which is derived from Teague's irradiance transport equation. Roddier obtained $$\frac{I_1 - I_2}{I_1 + I_2} = \left( \frac{\partial W}{\partial n} \delta_c - P\nabla^2 W \right) \Delta z \quad (5)$$

where $\Delta z$ is the distance from the pupil plane of the defocused plane $P_1$ or $P_2$ viewed from the object space. A plane at a distance from the focus is conjugated to a plane at a distance $\Delta z$ from the pupil. Roddier proved that $$\Delta z = \frac{f(f-l)}{l} \quad (5)$$

So Roddier obtained the well-known equation $$\frac{I_1 - I_2}{I_1 + I_2} = \frac{f(f-l)}{l} \left( \frac{\partial W}{\partial n} \delta_c - P\nabla^2 W \right) \quad (6)$$

Curvature sensing is a technique used typically in adaptive optics to measure the Laplacian of the wavefront by subtracting intensity profiles from an exact distance before and after the focus of a lens. The idea of the Roddier's curvature sensor is that the normalized differential intensity change along the optical axis provides the information of the local Laplacian curvature of the wavefront.

For adaptive optics systems, the image before and after the focus is usually switched mechanically, making the systems quite noisy during operation. In contrast, the Differential Shack-Hartmann curvature sensor contains no moving parts making it more reliable.

Interferometry is a technique to make the wavefront to interfere with itself or an ideal wavefront. It is especially good for measuring high spatial frequency aberrations and low amplitude aberrations. But air motion and mechanical vibrations make obtaining an image with an interferometer difficult, especially for testing large optics. Sophisticated software is necessary to extract meaningful and accurate information from interferograms. Commercial interferometers are typically expensive, where a high quality Shack-Hartmann wavefront sensor is typically much less expensive.

Foucault knife-edge testing involves moving a knife-edge through the focus of a beam and observing the intensity pattern on a screen. Like interferometry, knife-edge testing allows high-spatial frequency aberrations to be observed. But it requires very accurate alignment of the knife-edge to the beam focus, and it is qualitative test.

In summary, the Differential Shack-Hartmann Curvature sensor shares the important features of the Shack-Hartmann sensor, such as it is a real-time wavefront measurement, measurements are inherently two-dimensional and parallel, it is independent of higher-order aberrations and intensity profile variations, has good photon efficiency and is good for the all wavelength bands.

The Differential Shack-Hartmann Curvature Sensor also provides some unique features such as eliminating the need for external references after calibration, the sensor is independent of vibrations, tilt and whole body movements, which makes it a good choice for measurements with moving objects, and is scale tunable by changing differential values.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A differential Shack-Hartmann curvature sensing device for measuring a wavefront curvature comprising:
    a Shack-Hartmann sensor having an output beam;
    an optical element to split said output beam into a first, second and third beam, each of said first, second and third beam traveling in one of an x, y and z direction, respectively;
    a first, second and third lenslet array in the path of the first, second and third beam, respectively, to generate a corresponding first, second and third Hartmann grid each having plural grid points;
    a first and second shearing element for shifting said first and second Hartmann grids a lateral differential distance in a first direction and a second direction perpendicular to said first direction; and
    a measuring device for measuring plural slopes of plural wave fronts at each Hartmann grid point generated by said first, second and third beams to obtain a wavefront normal curvature and corresponding twist curvature terms to determine a principal curvature and direction, wherein said plural slopes at each of the plural Hartmann grid points is measured approximately simultaneously with and without differentially shifting the first and second Hartmann grids.

2. The device of claim 1, wherein each of said first and second shearing elements comprise:
    an opto-mechanical device.

3. The device of claim 1, wherein each of said first and second shearing elements comprise:
    an electro-optics device.

4. The device of claim 1, wherein each of said first and second shearing elements comprise:
    an optical parallel plate to make the differential displacements between the first and the second lenslet array.

5. The device of claim 1, wherein the first and second shearing elements comprise:
    a first and a second micro-screw.

6. The device of claim 1 said measuring device comprises:
    a first, second and third camera in a corresponding path of each of said first, second and third beam, respectively, for measuring said wave front slopes at each one of the plural Hartmann grid point.

7. The device of claim 1, further comprising:
    a processor for executing a set of instructions; and
    a first subset of instruction for calculating the wavefront normal curvatures in the x and the y direction by applying $$c_x(i) = \frac{\partial^2 W}{\partial x^2}\bigg|_i = \frac{1}{s_x}\left(\frac{\partial W}{\partial x}\bigg|_i - \frac{\partial W}{\partial x}\bigg|_i\right) = \frac{1}{f}\left(\frac{x_i'^{mea} - x_i^{mea}}{s_x}\right) - c_{0,x}(i)$$

$$c_y(i) = \frac{\partial^2 W}{\partial y^2}\bigg|_i = \frac{1}{s_y}\left(\frac{\partial W}{\partial y}\bigg|_i - \frac{\partial W}{\partial y}\bigg|_i\right) = \frac{1}{f}\left(\frac{y_i'^{mea} - y_i^{mea}}{s_y}\right) - c_{0,y}(i),$$

where $c_{0,x}(i)$ and $c_{0,y}(i)$ are obtained by $$c_{0,x}(i) = \frac{1}{f}\left(\frac{x_i'^{Ref} - x_i^{Ref}}{s_x}\right) \text{ and } c_{0,y}(i) = \frac{1}{f}\left(\frac{y_i''^{Ref} - y_i^{Ref}}{s_y}\right).$$

8. The device of claim 7, further comprising:
    a second subset of instructions for calculating the wavefront twist curvature terms by applying $$c_{xy}(i) = \frac{\partial^2 W}{\partial x \partial y}\bigg|_i = \frac{1}{s_y}\left(\frac{\partial W}{\partial x}\bigg|_i - \frac{\partial W}{\partial x}\bigg|_i\right) = \frac{1}{f}\left(\frac{x_i''^{mea} - x_i^{mea}}{s_y}\right) - c_{0,xy}(i)$$

$$c_{yx}(i) = \frac{\partial^2 W}{\partial y \partial x}\bigg|_i = \frac{1}{s_x}\left(\frac{\partial W}{\partial y}\bigg|_i - \frac{\partial W}{\partial y}\bigg|_i\right) = \frac{1}{f}\left(\frac{y_i'^{mea} - y_i^{mea}}{s_x}\right) - c_{0,yx}(i),$$

where $c_{0,yx}(i)$ and $c_{0,xy}(i)$ are constants given by $$c_{0,yx}(i) = \frac{1}{f}\left(\frac{y_i'^{Ref} - y_i^{Ref}}{s_x}\right) \text{ and } c_{0,xy}(i) = \frac{1}{f}\left(\frac{x_i''^{Ref} - x_i^{Ref}}{s_y}\right),$$

respectively.

9. The device of claim 8, further comprising:
    a third subset for calculating the wavefront principal curvatures $\kappa_1$ and $\kappa_2$ by applying $$\kappa_{1,2}(i) = \frac{c_x(i) + c_y(i) \pm \sqrt{(c_x(i) - c_y(i))^2 + 4c_{xy}(i)^2}}{2},$$

and the angle between the first principal curvature and the x-direction θ can be obtained by $$\theta(i) = \frac{1}{2}\tan^{-1}\left(\frac{2c_{xy}(i)}{c_x(i) - c_y(i)}\right).$$

10. The device of claim 1, further comprising:
a processor for calculating the wavefront principal curvatures $\kappa_1$ and $\kappa_2$ by applying $$\kappa_{1,2}(i) = \frac{c_x(i) + c_y(i) \pm \sqrt{(c_x(i) - c_y(i))^2 + 4c_{xy}(i)^2}}{2},$$

and obtaining an angle between a first principal curvature and the x-direction θ according to $$\theta(i) = \frac{1}{2}\cos^{-1}\left(\frac{|c_x(i) - c_y(i)|}{\sqrt{(c_x(i) - c_y(i))^2 + 4c_{xy}(i)^2}}\right).$$

11. A system for measuring differentials of wave front slopes to determine a wavefront curvature without the use of a reference, the system comprising:
a light source for generating an input light beam;
a beam splitter splitting the input light beam to produce a first, second and third output beam in different directions;
a first, second and third lenslet array in the first, second and third beam for generating a corresponding first, second and third Hartmann grid;
at least one optical element for shearing said first and said second beam in a first direction and a second direction perpendicular to said first direction for shifting said first and second Hartmann grids a differential distance in said first direction and said second directions;
a measuring system for measuring a slope at each one of plural Hartmann grid points generated by said first, second and third output beams; and
a processor for executing a set of instructions for calculating a normal curvature and a principal curvature of a wavefront from said slopes measured at each of the plural Hartmann grid points.

12. The system of claim 11, wherein at least one optical element comprises:
a first and a second optical parallel plates for making differential displacements between the first and the second lenslet arrays.

13. The system of claim 11, wherein the beam splitter comprising:
a first and second optical parallel plate to act as the beam splitter for splitting the input beam into the first, second and third output beams and act as the at least one optical element to make differential displacements between the first, second and third lenslet arrays, wherein the first and third lenslet arrays shear each other in the first direction and the second and third lenslet arrays shear each other in the second direction.

14. The system of claim 11, wherein said measuring system comprises:
a first, second and third camera in each of said first, second and third beam, respectively, for recording approximately simultaneously said slopes at each one of the plural Hartmann grid points of the first, second and third Hartmann grids to obtain slope differentials.

15. The system of claim 11, wherein said set of instructions comprises:
a first subset of instructions to obtain a derivative of the plural wave front slopes at the plural Hartmann grid points to compute said wavefront local curvatures and principal curvatures and corresponding directions.

16. A method for measuring a normal curvature of a wavefront with a differential Shack-Hartmann Curvature sensor comprising the steps of:
providing a Shack-Hartmann sensing system having a first, second and third output beams in different directions for generating a corresponding first, second and third Hartmann grids each having plural Hartmann grid points;
making the first and second Hartmann grids sheared a differential displacement compared to said third Hartmann grid in a first and second perpendicular direction, respectively;
measuring differentials of the plural wave front slopes at plural Hartmann grid points of the third Hartmann grid; and
determining said normal curvature of said wavefront from said measured differentials of said plural wave front slopes.

17. The method of claim 16 wherein the normal curvature determination step comprises the step of:
applying $$c_x(i) = \frac{1}{f}\left(\frac{x_i'^{mea} - x_i^{mea}}{s_x}\right) - c_{0,x}(i) \text{ and } c_y(i) = \frac{1}{f}\left(\frac{y_i''^{mea} - y_i^{mea}}{s_y}\right) - c_{0,y}(i),$$

where $c_{0,x}(i)$ and $c_{0,y}(i)$ are obtained by $$c_{0,x}(i) = \frac{1}{f}\left(\frac{x_i'^{Ref} - x_i^{Ref}}{s_x}\right) \text{ and } c_{0,y}(i) = \frac{1}{f}\left(\frac{y_i''^{Ref} - y_i^{Ref}}{s_y}\right),$$

to the measured coordinate differentials to obtain said normal curvature of said wavefront.

18. The method of claim 16, wherein the normal curvatures determination step comprises the step of:
Applying $$c_{xy}(i)\frac{1}{f}\left(\frac{x_i''^{mea} - x_i^{mea}}{s_y}\right) - c_{0,xy}(i) \text{ and } c_{yx}(i) = \frac{1}{f}\left(\frac{y_i'^{mea} - y_i^{mea}}{s_x}\right) - c_{0,yx}(i),$$

where $c_{0,yx}(i)$ and $c_{0,xy}(i)$ are constants given by $$c_{0,yx}(i) = \frac{1}{f}\left(\frac{y_i'^{Ref} - y_i^{Ref}}{s_x}\right) \text{ and } c_{0,xy}(i) = \frac{1}{f}\left(\frac{x_i''^{Ref} - x_i^{Ref}}{s_y}\right),$$

to the measured coordinate differentials to obtain said normal curvatures of said wavefront.

19. The method of claim 16 further comprising the step of:
calibrating said Shack-Hartmann sensing system to reduce systematic errors.

20. The method of claim 19, wherein the calibration step comprises the steps of:

using a reference light beam to produce a first, second and third reference Hartmann grid for calibration according to $$c_x(i) = \frac{1}{f}\left(\frac{x_i'^{mea} - x_i^{mea}}{s_x} - c_{0,x}(i)\right)$$

$$c_y(i) = \frac{1}{f}\left(\frac{y_i''^{mea} - y_i^{mea}}{s_y} - c_{0,y}(i)\right); \text{ and}$$

recording a first, second and third reference Hartmann grid produced to obtain the constants $c_{0,x}(i)$ and $c_{0,y}(i)$ by $$c_{0,x}(i) = \frac{1}{f}\left(\frac{x_i'^{Ref} - x_i^{Ref}}{s_x}\right) \text{ and } c_{0,y}(i) = \frac{1}{f}\left(\frac{y_i''^{Ref} - y_i^{Ref}}{s_y}\right),$$

wherein after calibration the differential Shack Hartmann curvature sensor determines the wavefront curvature without use of one of a reference light source and an external reference.

21. The method of claim 19, wherein the calibration step comprises the steps of:

using a reference light beam to produce a first, second and third reference Hartmann grid for calibration according to $$c_{xy}(i) = \frac{1}{f}\left(\frac{x_i''^{mea} - x_i^{mea}}{s_y}\right) - c_{0,xy}(i)$$

$$c_{yx}(i) = \frac{1}{f}\left(\frac{y_i'^{mea} - y_i^{mea}}{s_x}\right) - c_{0,yx}(i); \text{ and}$$

recording a first, second and third reference Hartmann grid produced to obtain the constants $c_{0,yx}(i)$ and $$c_{0,xy}(i) \text{ by } c_{0,yx}(i) = \frac{1}{f}\left(\frac{y_i'^{Ref} - y_i^{Ref}}{s_x}\right) \text{ and } c_{0,xy}(i) = \frac{1}{f}\left(\frac{x_i''^{Ref} - x_i^{Ref}}{s_y}\right),$$

wherein after calibration, the differential Shack Hartmann curvature sensor determines the wavefront twist curvatures without use of one of a reference light source and an external reference.

22. The method of claim 16 wherein said differential measurement step comprises the steps of:

measuring coordinates of plural Hartmann grid points of the plural wavefronts with said differential displacement; and measuring coordinates of plural Hartmann grid points of the plural wavefronts without said differential displacement.

23. The method of claim 16, further comprising the step of:

using the differential Shack-Hartmann curvature sensor for optical testing to determine the wavefront curvature which is independent of vibration, tilt or whole body movement.

24. A method for measuring a principal curvature of a wavefront with a differential Shack-Hartmann Curvature sensor comprising the steps of:

providing a Shack-Hartmann sensing system having a first, second and third output beams in different directions for generating a corresponding first, second and third Hartmann grids each having plural Hartmann grid points;

making the first and second Hartmann grids sheared a differential displacement to said third Hartmann grid in a first and second perpendicular direction, respectively;

measuring differentials of plural wavefront slopes at the plural Hartmann grid points of the third Hartmann grid; and determining a normal curvature and corresponding twist curvature term of said wavefront from said measured differentials of said plural wave front slopes; and determining said principal curvature and corresponding principal direction of said wavefront from said normal curvature and said twist curvature terms.

25. The method of claim 24, wherein the principal curvatures determination step comprises the step of:

applying $$\kappa_{1,2}(i) = \frac{c_x(i) + c_y(i) \pm \sqrt{(c_x(i) - c_y(i))^2 + 4c_{xy}(i)^2}}{2}$$

to said normal curvature and said twist curvature terms to obtain said principal curvatures of said wavefront.

26. The method of claim 24, wherein the principal directions determination step further comprises the step of:

applying $$\theta(i) = \frac{1}{2}\tan^{-1}\left(\frac{2c_{xy}(i)}{c_x(i) - c_y(i)}\right)$$

to said normal curvature and said twist curvature terms to obtain said principal directions of said wavefront.

27. The method of claim 24, wherein the principal directions determination step comprises the step of:

applying $$\theta(i) = \frac{1}{2}\cos^{-1}\left(\frac{|c_x(i) - c_y(i)|}{\sqrt{(c_x(i) - c_y(i))^2 + 4c_{xy}(i)^2}}\right)$$

to said normal curvature and said twist curvature terms to obtain said principal directions of said wavefront.

* * * * *